United States Patent [19]

Lauffenburger

[11] 4,222,593
[45] Sep. 16, 1980

[54] FLUID-CONVEYING COUPLING WITH SAFETY LOCKING DEVICE

[76] Inventor: Robert F. Lauffenburger, 726 Cobham Park Rd., Warren, Pa. 16365

[21] Appl. No.: 27,604

[22] Filed: Apr. 5, 1979

[51] Int. Cl.² ............................................. F16L 55/00
[52] U.S. Cl. ................................... 285/85; 285/312; 285/317; 403/317
[58] Field of Search ..................... 285/312, 81, 82, 84, 285/85, 86, 87, 91, 88, 317, 320, 309–311; 403/317

[56] References Cited

U.S. PATENT DOCUMENTS

| 965,998 | 8/1910 | Evans | 285/317 X |
| 2,023,263 | 12/1935 | Blume | 285/84 |
| 3,124,374 | 3/1964 | Krapp | 285/88 X |
| 3,439,942 | 4/1969 | Moore et al. | 285/82 X |
| 3,976,313 | 8/1976 | Lauffenburger | 285/84 |

FOREIGN PATENT DOCUMENTS 1009582 6/1957 Fed. Rep. of Germany ............ 285/85

Primary Examiner—Dave W. Arola
Attorney, Agent, or Firm—Le Blanc, Nolan, Shur & Nies

[57] ABSTRACT

A coupling having male and female coupling members, at least one coupling lever pivotally mounted on the female coupling member and having a cam portion engageable in a groove in the male coupling member for releaseably coupling the male and female coupling members together, and at least one safety locking device for locking the coupling lever against accidental displacement from its coupling position. The safety locking device includes a reciprocally mounted locking pin or member, a spring for biasing the locking pin to a locking position where it overlies the coupling lever in its coupling position to block movement of the coupling lever to its uncoupling position, and a manually manipulatable lever member engaging the locking pin and pivotal to retract the locking pin to a lock-release position.

10 Claims, 7 Drawing Figures

U.S. Patent     Sep. 16, 1980     4,222,593

FLUID-CONVEYING COUPLING WITH SAFETY LOCKING DEVICE

FIELD OF INVENTION

This invention relates to fluid-conveying couplings and particularly to quick release couplings which are equipped with a safety locking device to guard against accidental disconnection of the coupling members.

BACKGROUND

Prior to this invention various types of safety locking devices have been proposed for protecting against accidental disconnection of the male and female coupling members. Representative teachings of such safety locking devices are found in U.S. Pat. No. 3,124,374 issued on Mar. 10, 1964; U.S. Pat. No. 3,976,313 issued on Aug. 24, 1976; U.S. Pat. No. 2,419,916 issued on Apr. 29, 1947; U.S. Pat. No. 2,2023,263 issued on Dec. 3, 1935; U.S. Pat. No. 3,439,942 issued on Apr. 22, 1969; and U.S. Pat. No. 965,998 issued on Aug. 2, 1910.

In prior coupling constructions of the type described in U.S. Pat. No. 2,023,263 vibrations tend to have the effect of dislodging the locking member from its locking position, thereby subjecting the coupling members to accidental disconnection. Other prior coupling locking devices are disadvantageous because they cannot be applied to existing couplings without making significant modification to the coupling structure itself. Still other safety locking constructions of the type described in U.S. Pat. No. 3,976,313, while being less subject to vibrations and adaptable to existing couplings, constitute relatively expensive constructions requiring detent balls and structure for supporting the detent balls in their operative positions. Furthermore, the type of locking device described in U.S. Pat. No. 3,976,313 is non-positive in the sense that it can be released merely by lifting the coupling's latching levers to their disconnect positions.

The present invention, in representing an improvement over the construction described in U.S. Pat. No. 3,976,313, has none of the foregoing drawbacks and offers additional advantages as will become apparent from the following summary and detailed description.

SUMMARY AND OBJECTS OF INVENTION

In the preferred embodiment of this invention the coupling is equipped with a pair of latching or clamping levers, corresponding to the ones shown in U.S. Pat. No. 3,976,313, to provide for the quick connection and disconnection of the coupling's male and female members. The latching levers are conventionally formed with cam portions at corresponding ends and are pivotally mounted on the female coupling member for seating the cam portions in a peripheral groove in the male coupling member to thereby latch the male and female coupling members together. In their coupling latching positions the latching levers lie generally flat along the coupling's periphery and parallel to the coupling's longitudinal axis.

In place of the detent ball locking arrangement shown in U.S. Pat. No. 3,976,313 the present invention provides for a unique positive locking arrangement wherein each latching lever is releasably locked in its latching position by a locking pin or member which is mounted for rectilinear movement along a path extending transversely of the coupling's longitudinal axis. A separate thumb lever is operatively connected to each locking pin and is pivotally supported for manually shifting its locking member to a retracted position against the bias of a spring to allow the latching lever to be raised or swung upwardly to its unlatching position. The biasing spring for each thumb lever normally urges the locking pin to a forward locking position where its nose overlies the latching lever when the latter is in its coupling latching position, thereby positively preventing the latching lever from being accidently swung upwardly to its unlatching position.

Guard protectors are advantageously positioned on the female coupling body on opposite sides of the thumb lever to protect against accidental movement of the thumb lever to its lock-releasing position. The arrangement is such that the guard protectors together with the structure for mounting the lock pin and the thumb lever are readily attachable to an existing coupling without requiring any significant modification to the coupling. Alternatively, the guard protectors and the structure for mounting the lock pin and the thumb lever may be cast with the female coupling body to form an integral part thereof.

With the foregoing in mind, it is the general aim and purpose of this invention to equip a coupling with an improved safety locking device for positively locking the coupling's latching levers or handles in their latching positions.

Another object of this invention is to provide a novel coupling lever locking mechanism which is simple in construction, economical to manufacture and simple and easy to install and use as well as providing a positive lock to preclude accidental disconnection of the male and female coupling members.

Yet another object of this invention is to provide a novel coupling locking mechanism of the character described above wherein the lock mechanism's release member is guarded against accidental movement to a lock-releasing position.

A further object of this invention is to provide a coupling with an improved safety lock mechanism which is constructed in such a way to enable it to be added to existing coupling casting in stock or alternatively be incorporated with the coupling at the time of manufacturing the coupling as well as being added to patterns and made with new castings.

Further objects of this invention will appear as the description proceeds in connection with the appended claims and below-described drawings.

DETAILED DESCRIPTION

Figure 1:
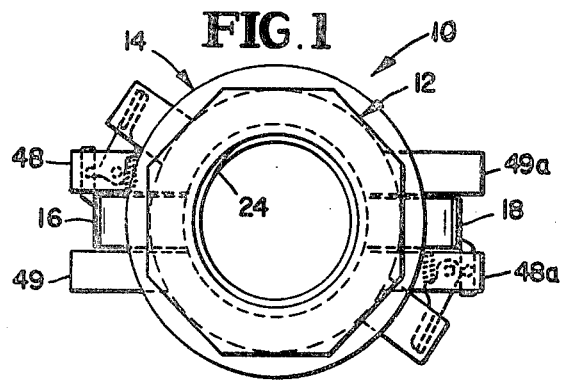
FIG. 1 is an end elevation of a coupling incorporting the principles of this invention.
Figure 2:
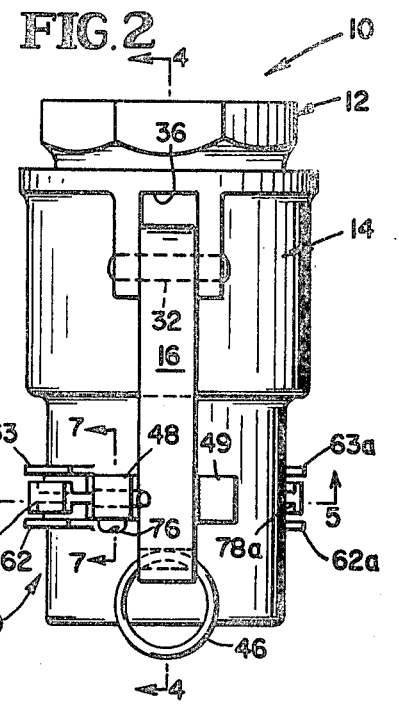
FIG. 2 is a side elevation of the coupling shown in FIG. 1 and illustrating the coupling's latching levers locked in their coupling latching positions.
Figure 3:
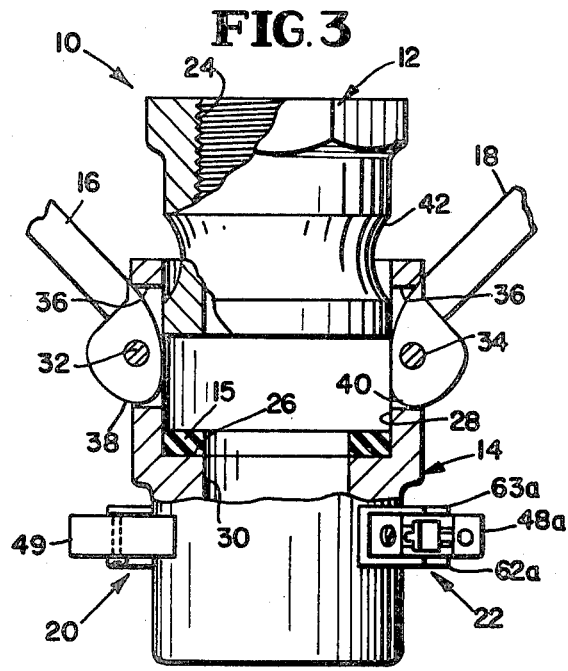
FIG. 3 is a partially sectioned side elevation of the coupling rotated 90 degrees from the orientation shown in FIG. 2 and illustrating the coupling's latching levers in their coupling disconnect positions with the male coupling member partially removed from the companion female coupling member.
Figure 4:
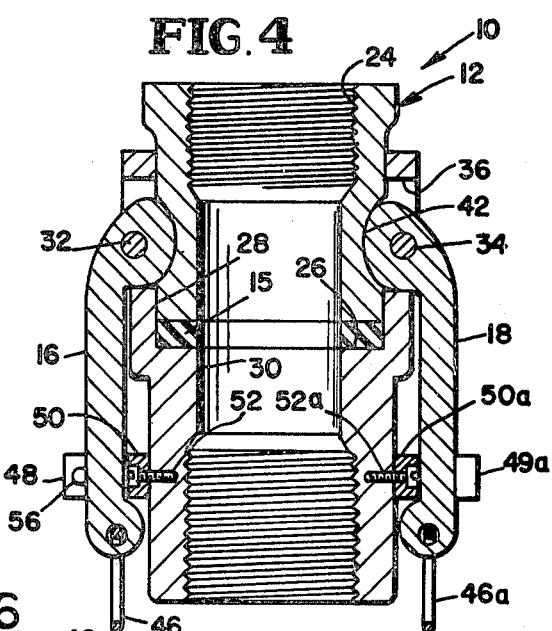
FIG. 4 is a longitudinal section taken substantially along lines 4—4 of FIG. 2.

Referring to FIGS. 1–3, the fluid-conveying coupling incorporating the principles of this invention is generally indicated at 10 and is shown to mainly comprise a male coupling member 12, a companion or complementary female coupling member 14, a gasket ring 15, a pair of coupling latching handles or levers 16 and 18, and a pair of safety locking devices or mechanisms 20 and 22, one for each of the latching levers. The construction and arrangement of the male and female coupling members 12 and 14, latching levers 16 and 18 and gasket ring 15 may be the same as that shown and described in the aforementioned U.S. Pat. No. 3,976,313.

As shown, the male coupling member 12 may be internally threaded to permit it to be affixed to the externally threaded end of a pipe (not shown). The female coupling member 14 may likewise be internally threaded for connection to another pipe (not shown). Alternatively, the female coupling member 14 may form an integral part of the body of a valve. Members 12 and 14 each have a generally tubular configuration as shown.

The male and female coupling members 12 and 14 may be cast or otherwise fabricated from suitable material. The male coupling member 12 is formed with a uniformly diametered through passage 24 for conveying fluid. The female coupling member 14 is also formed with a through fluid-conveying passage which is stepped to form an internal axially facing annular shoulder 26 at the interface between an enlarged diametered passage section 28 and a reduced diametered passage section 30. Passage sections 28 and 30 are each uniformly diametered. Gasket ring 15 is received in passage section 28 and seats against the annular shoulder 26 as shown.

Latching levers 16 and 18 are disposed on diametrically opposite sides of coupling member 14 and are pivotally mounted at corresponding ends on the female coupling member by means of pivot pins 32, 34. The pivoted ends of levers 16 and 18 are received in diametrically opposed apertures 36 formed through the peripheral wall of the female coupling member as shown in FIG. 3. Levers 16 and 18 are integrally formed with eccentric cams 38, 40 at their pivoted ends. The pivot axes of the latching levers 16 and 18 are parallel and lie in a common plane normally intersecting the longitudinal axis of coupling 10.

As shown, the male coupling member 12 is adapted to be slidably and coaxially received in the enlarged passage section 28 of the female coupling 14 to seat against and seal with the gasket ring 15. Male coupling member 12 is exteriorly formed with an outward opening, cam-receiving peripheral groove 42 which registers with apertures 36 when the male coupling member is fully inserted into the female coupling member in a position where its end face seats against gasket ring 15.

Figure 5:
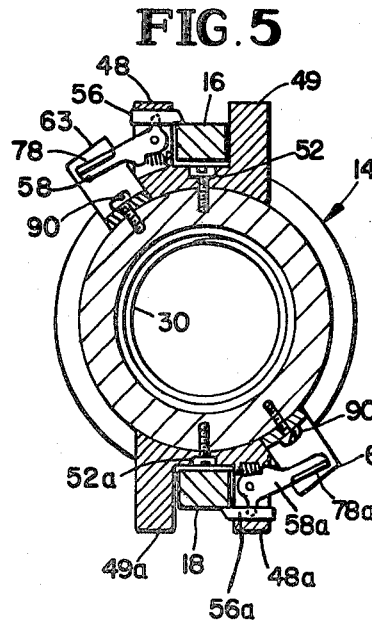
FIG. 5 is a transverse section taken substantially along lines 5—5 of FIG. 2.

From the construction thus far described it will be appreciated that levers 16 and 18 may be manually swung from a coupling disconnect position generally perpendicular to the longitudinal axis of coupling 10 to a coupling latching position where they lie generally flat along the outer periphery of the female coupling member 14 in generally parallel relation with the coupling's longitudinal axis. When levers 16 and 18 are moved to their extreme coupling disconnect positions shown in FIG. 3 their cam portions 38 and 40 do not project into passage section 28, thus allowing for the insertion and removal of the male coupling member 12. When the male coupling member 12 is received in passage section 28 of the female coupling member 14, rotation of the latching levers 16 and 18 to their coupling latching positions shown in FIGS. 2 and 5 causes cam portions 38 and 40 to move into passage section 28 and to ride into the peripheral groove 42 on the male coupling member 12. The camming action of cam portions 38 and 40 in groove 42 draws the male coupling member 12 tightly against gasket ring 15 to establish a fluid tight seal between the two coupling members and to thereby prevent leakage of fluid conveyed through coupling 10.

Manually grippable finger rings, as indicated at 46 in FIG. 2, may be secured to the distal ends of latching levers 16 and 18 to more easily facilitate the pivotal displacement of the latching levers between their coupling disconnect and connect positions. In its coupling latching position the distal end of lever 16 lies between a pair of upstanding parallel spaced apart guard protector posts or ears 48 and 49. Likewise, the distal end of lever 18 lies between a further pair of parallel spaced apart upstanding guard protector posts or ears 48a and 49a when lever 18 is in its coupling latching position.

Posts 48 and 49 may be integrally joined to or otherwise suitably fixed to a base 50 which seats against a surface of the female coupling member 14 and which is fixed to the female coupling member 14 by any suitable means such as welding. Likewise, posts 48a and 49a may be integrally joined to or otherwise suitably fixed to a further base 50a which is seated against a surface of the female coupling member 14 and which is suitably secured to the female coupling member by welding. Alternatively, bases 50 and 50a may be fixed to coupling member 14 by suitable fasteners such as screws 52, 52a.

Referring now to FIGS. 2 and 4–7, the locking device 20 for latching lever 16 comprises a lock pin 56, a manually manipulatable thumb lever 58, a lever biasing spring 60, and a pair of guard protector ears 62 and 63 for thumb lever 58. Lock pin 56 is slidably and coaxially received in a hole 66 which is formed through post 48 for rectilinear movement between release and locking positions along a straight path extending normal to the coupling's longitudinal axis and disposed outwardly with respect to the distal end of lever 16 when the latching lever is in its latching position as shown in FIG. 2.

In its forwardly advanced locking position, a nose portion 70 of lock pin 56 overlies latching lever 16 near its distal end to block upward swinging movement of latching lever 16 from its latching position. As is apparent from FIG. 6, an attempt to swing lever 16 upwardly from its latching position results in the abutment of the lever with a bottom abutment surface 72 of the lock pin's nose portion 70. Lock pin 56 is advantageously formed with an abutment shoulder 74 depending from the inner end of surface 72 to abut the opposing side edge of latching lever 16 as lock pin 56 is slid forwardly towards latching lever 16. Abutment of shoulder 74 with the side edge of lever 16 limits the forward motion of latch pin 56.

Figure 6:
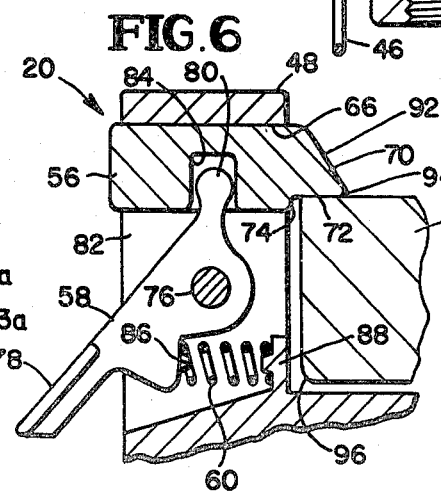
FIG. 6 is an enlarged fragmentary view of the section shown in FIG. 5.
Figure 7:
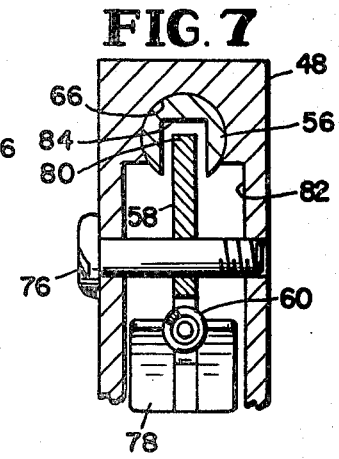
FIG. 7 is a section taken substantially along lines 7—7 of FIG. 2.

Lock pin 56 is laterally slidable away from its locking position illustrated in FIG. 6 to a retracted position where it is laterally spaced from latching lever 16, thereby freeing the latching lever for upward swinging movement to its coupling disconnect position.

As shown, thumb lever 58 is rotatably or pivotally mounted on the cylindrically smooth portion of a suitable pivot member such as a screw 76 which is threaded in and fixed to post 48 to provide for the pivotal displacement of lever 58 about an axis extending parallel to the coupling's longitudinal axis. The longitudinal axis of lock pin 56 and hence the straight line path of movement of lock pin 56 lie in a plane normally intersecting the pivot axis of lever 58 and the longitudinal coupling axis.

At its outer end thumb lever 58 is formed with a flat thumb engaging portion 78. The other end of thumb lever 58 is in the form of a knuckle or knob 80. The pivot axis of lever 58 lies generally between the lever ends 78, 80 as shown in FIG. 6. The knuckle end 80 of thumb lever 58 projects through an elongated longitudinal slot 82 in post 48 and is loosely received in a socket or recess 84 in lock pin 56 to establish an operative motion transmitting connection between thumb lever 58 and lock pin 56. This motion transmitting connection allows straight line reciprocable movement of lock pin 56 in response to pivotal movement of lever 58 about its pivot axis.

Spring 60 may be of coil type and is compressed and confined between a portion 86 on lever 58 and a portion 88 of post 48. Spring 60 yieldably urges thumb lever 58 in a clockwise direction as viewed from FIG. 6 to thus bias lock pin 56 to its forward locking position (see FIG. 6) through the motion transmitting connection established by reception of the thumb lever's end 80 in socket 84. Depression of the lever end portion 78 to effect rotation of thumb lever 58 in a counterclockwise direction against the bias of spring 60 results in the retraction of lock pin 56 to its previously described lock release position. When thumb lever 58 is released it will be appreciated that spring 60 will then urge lever 58 in its clockwise position to advance lock pin 56 forwardly to its locking position. Lock pin 56 is therefore normally biased to its locking position by spring 60 which acts through lever 58 and the motion transmitting connection established by the knuckle and socket formations 80 and 84.

As best shown in FIG. 2, the thumb engaging end portion 78 of lever 58 is received between the ears 62 and 63 which act as guard protectors to protect against accidental displacement of lever 58 in its lock-releasing direction against the bias of spring 60. Ears 62 and 63 may be fixed to the body of the female coupling member 14 by fastening means such as screws 90 or by other means such as welding. Alternatively, ears 62 and 63 may be integrally cast with the female coupling member 14 at the time that the female coupling member is cast or otherwise fabricated.

From the foregoing description it will be appreciated that post 48 mounts lock pin 56, thumb lever 58 and spring 60 and may be attachable to an existing female coupling member by suitable fastening means such as screws. Likewise, the guard protector ears 62 and 63 may also be attached to an existing female coupling body by screws, thus permitting the entire assembly of the locking device to be mounted on an existing female coupling body.

When locking pin 56 is in its locking position where it is latched over latching lever 16 to hold latching lever 16 in its latching position, it will be appreciated that the lock cannot be released by lifting latching lever 16, but instead can only be released by depressing thumb lever 58 against the bias of spring 60 in the manner previously described. In this way, a positive safety lock is established to retain latching lever 16 in its latching position.

As best shown in FIG. 6, the nose portion of locking pin 56 is formed with an inclined cam surface 92 which faces outwardly. Surface 92 lies obliquely with respect to the lock pin's longitudinal axis and slopes backwardly from a corner edge 94 which is formed at the juncture between surfaces 92 and 72. As latching lever 16 is pivoted towards its latching position, the lower corner region 96 of lever 16 will engage and ride along the cam surface 92, thus urging or camming lock pin 56 back to its lock release or retracted position against the bias of spring 60. As the latching lever rides past the lock pin's corner edge 94 it releases lock pin 56, thereby allowing spring 60 to urge lock pin 56 forwardly to a position where the abutment surface 72 overlies latching lever 16 and abutment shoulder 74 seats against the side of latching lever 16 in the manner best shown in FIG. 6. It will be noted that lock pin 58 is held in its assembled relationship with post 48 by the engagement with the lever end 80.

The safety locking device 22 for lever 18 is the same as the locking device 20. Accordingly, like reference numerals have been applied to designate like components of the two locking devices except that the reference numerals for locking device 22 have been suffixed by the letter a to distinguish them from the reference numerals used for locking device 20.

Locking device 22 operates in the same manner as described for locking device 20. As shown, the locking pin 56a, thumb lever 58a and spring 60a are all supported by posts 48a in the same manner that the component parts of locking device 20 are mounted on post 48.

In order to interconnect coupling members 12 and 14 latching levers 16 and 18 are first pivoted to their coupling disconnect positions shown in FIG. 3. The male coupling member 12 is then inserted into the female coupling member 14, and latching levers 16 and 18 are then swung to their coupling latching positions (see FIG. 2) to move cam portions 38 and 40 into groove 42 in the manner previously explained. As latching levers 16 and 18 approach their coupling latching positions the edges of the latching levers engage and slide along the inclined or sloped camming surfaces of the locking pins thereby forcing the locking pins to retract to their lock release positions and thus allowing the latching levers to be moved passed the locking pins. As the levers pass beyond the ends of the locking pin nose portions, releasing the locking pins 56 and 56a, springs 60 and 60a urge their respective locking pins 56 and 56a to their locking positions where they overlie levers 16 and 18, respectively, thus locking the latching levers in their latching positions.

To uncouple coupling members 12 and 14, lock pins 56 and 56a are first retracted by depressing thumb levers 58 and 58a. Then, with pins 56 and 56a held in their retracted positions, levers 16 and 18 are swung to their coupling release positions.

The lock established by lock pin 56 is positive in the sense that it will not release or move back to its lock-released position by the force exerted on lever 16 in an effort to swing the latching lever upwardly from its latching position.

It also will be appreciated that levers 16 and 18 are operative to couple the coupling members 12 and 14 together. The construction and operation of levers 16 and 18 and coupling members 12 and 14 are also the same as that described in the previously mentioned U.S.

Pat. No. 3,124,374 which is hereby incorporated by reference into this specification.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. In a coupling, a fluid passage-defining male coupling member, a fluid passage-defining female coupling member for receiving said male coupling member, and at least one coupling and locking assembly comprising a coupling lever pivotally mounted on said female coupling member for selective pivotal movement between angularly spaced apart coupling and uncoupling positions about an axis extending transversely with respect to the longitudinal axes of said coupling members, means positioned on said lever for engaging a portion of said male member upon displacement of said lever to said coupling position to releasably couple said male and female coupling members together, said lever being swingable to its uncoupling position for uncoupling said male and female coupling members from each other and safety lock means for releasably locking said lever in its coupling position and including a support structure rigid with said female coupling member, a locking member supported by said support structure for reciprocal movement along a path extending transversely with respect to said lever, said locking member being displaceable along said path to a locking position where it overlies said coupling lever when the coupling lever is in its coupling position to block pivotal movement of said coupling lever towards its uncoupling position, said locking member further being retractable from said locking position to a release position where it releases said coupling lever for pivotal movement from its coupling position to its uncoupling position, manually manipulatable lever means supported on said support structure for pivotal movement in opposite directions, said lever means engaging said locking member and being pivotable in a pre-selected direction to displace said locking member along said path from said locking position to said release position, and biasing means acting on the assembly of said lever means and said locking member for yieldably urging said locking member to said locking position.

2. The coupling defined in claim 1 wherein said lever means is pivotal about an axis extending transversely with respect to said path of movement of said locking member and parallel to the longitudinal axes of said coupling members.

3. The coupling defined in claims 1 or 2 wherein said locking member is rectilinearly displaceable between said locking and said release positions.

4. The coupling defined in claims 1 or 2 wherein said locking member is formed on its underside with an abutment surface which is positioned to be engaged by said coupling lever to block movement of the coupling lever from its coupling position without resulting in the displacement of said locking member to its release position.

5. The coupling defined in claim 1 wherein a manually engagable end portion of said lever means is positioned between a pair of guards that protect said lever means from accidental displacement in said pre-selected direction.

6. The coupling defined in claim 5 wherein said guards and said support structure are attached to said female coupling member by fastener means which enable said guards and said support structure to be secured to an existing female coupling member.

7. The coupling defined in claim 1 wherein said biasing means comprises a spring acting against a portion of said lever means to pivotally urge said lever means in a direction that advances said locking member to said locking position.

8. The coupling defined in claim 1 wherein said locking member is formed on the underside thereof with an abutment shoulder that engages said coupling lever when the coupling lever is in its coupling position to limit the movement of said locking member in the direction of said coupling lever.

9. The coupling defined in claim 1 wherein said locking member has an end portion that lies in the path of said coupling member when the locking member is in said locking position, said end portion terminating in an inclined surface facing in a direction to be engaged by said coupling lever as said coupling lever is pivoted toward its coupling position, the inclination of said surface being such that said locking member is forced to said retracted position against the bias of said biasing means by the engagement of said coupling lever with said surface as the coupling lever is pivoted towards its coupling position.

10. The coupling defined in claim 1, there being at least two such coupling and locking assemblies arranged in spaced apart relation on said female coupling member.

* * * * *